E. H. FREEMAN.
WATERPROOF ELECTRICAL SOCKET.
APPLICATION FILED NOV. 30, 1910.

984,130. Patented Feb. 14, 1911.

Witnesses:
R. C. Braddock.
Emory L. Groff.

Inventor:
E. H. FREEMAN.
By S. P. Hollhaupter,
his Attorney.

UNITED STATES PATENT OFFICE.

EDGAR H. FREEMAN, OF TRENTON, NEW JERSEY.

WATERPROOF ELECTRICAL SOCKET.

984,130.

Specification of Letters Patent. Patented Feb. 14, 1911.

Application filed November 30, 1910. Serial No. 594,990.

*To all whom it may concern:*

Be it known that I, EDGAR H. FREEMAN, a citizen of the United States, residing at Trenton, in the county of Mercer and State of New Jersey, have invented certain new and useful Improvements in Weatherproof Electrical Sockets, of which the following is a specification.

The present invention relates to plug-receiving sockets or receptacles employed in places exposed to the elements, and the primary object is to provide a simple and readily separable structure, which will effectively withstand the deleterious influences of the weather, and can be wired with the greatest ease and expedition, and without the necessity of bunching the wire or requiring a superfluous amount of the same.

A practical embodiment of the invention is disclosed in the accompanying drawings, but it will be obvious from an inspection of the claims hereto appended that the invention is not necessarily limited to the specific structure illustrated.

Figure 1:
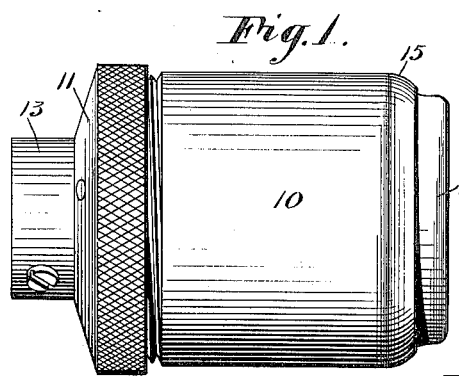
Figure 2:
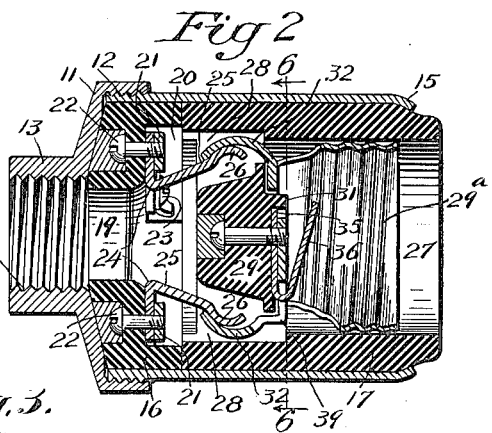
Figure 3:
Figure 4:
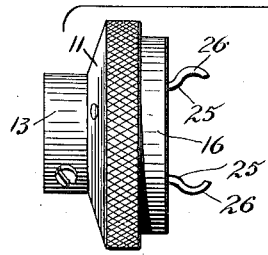
Figure 4:
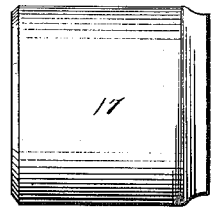
Figure 4:
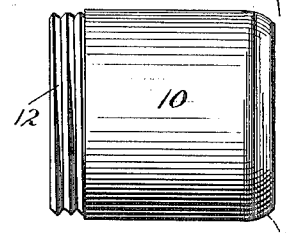
Figure 4:
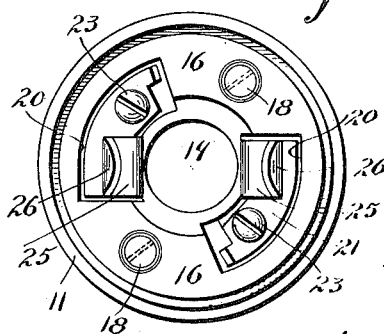
Figure 5:
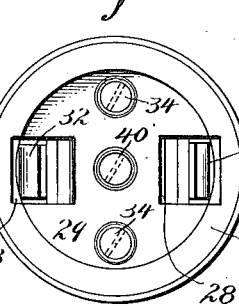
Figure 6:
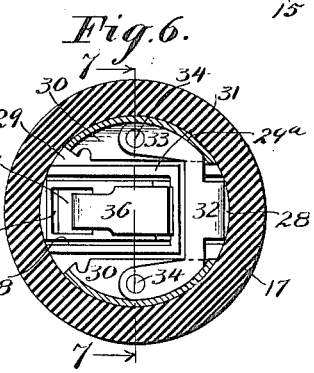
Figure 7:
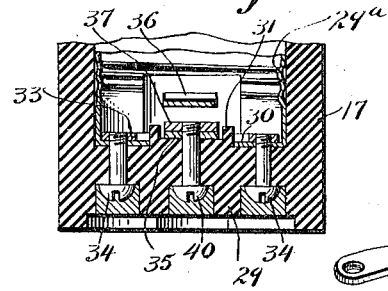
Figure 8:
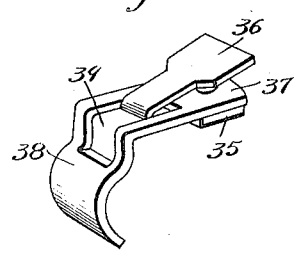
Figure 9:
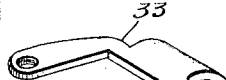

In said drawings, Figure 1 is a side elevation of the socket. Fig. 2 is a longitudinal sectional view therethrough. Fig. 3 is a side elevation showing the parts separated. Fig. 4 is a plan view of the base member of the socket. Fig. 5 is an inner end view of the body member of the socket. Fig. 6 is a cross sectional view substantially on the line 6—6 of Fig. 2. Fig. 7 is a detail sectional view on the line 7—7 of Fig. 6. Fig. 8 is a perspective view of the center plug contact and the coupling finger associated therewith. Fig. 9 is a perspective view of the coupling finger for the screw shell contact.

In the embodiment disclosed, an outer protective casing, preferably of metal, is employed comprising a cylindrical body section 10 and base cap 11 detachably associated therewith and preferably threaded thereto as shown at 12. This cap has a rearwardly extending nipple 13 provided with a wire-receiving opening, and internally threaded as at 14 in order to permit it to be screwed to a conduit or other support. The cylindrical body 10 has an open front end, which is preferably contracted slightly, as illustrated at 15. Within this protective casing is located the receptacle formed of insulating material, preferably porcelain and comprising two separable sections, namely, a base section 16 and a body section 17 that are confined together within the protective casing, as will be clear by reference to Fig. 2. The base section 16 is rigidly secured to the cap 11 of the protective casing by screws 18 or other fasteners, and said section has a wire-receiving opening 19 alining with the opening in the nipple 13. The front face of said base section is cut away to form seats 20 in which are located wire-terminal plates 21 held in place by suitable screws or other fasteners 22, and being provided with binding screws 23, to which the terminals of the line wires can be attached. The plates 21 also constitute clamping means for the offset ends 24 of outwardly and divergently projecting coupling fingers 25 formed of spring metal and having bowed free ends 26. It will be observed that the offset ends 24 are interposed between the wire terminal plates 21 and the base, and that the fasteners 22 pass therethrough, (see Fig. 2). It will also be noted that the fingers 25 project beyond the front face of the base.

The body section 17 of the receptacle is provided with a plug-receiving socket 27 that opens through the front end thereof, and communicates at its inner end with a pair of spaced recesses 28 formed in the bottom part of said body section. These recesses 28 are located in opposite portions of the bottom wall 29 of the plug-receiving socket 27. Arranged in said socket 27 is the usual screw shell contact 29ª, affording the side contact for the plug placed in the socket, and this screw shell contact has a bottom wall 30 that is cut away and surrounds a boss 31 formed on the center of the wall 29. A rearwardly extending bowed coupling finger 32 is carried by yoke plate 33 that bears against the bottom wall 30 of the screw shell 29, and said plate and shell are fastened in place by holding devices 34 passing therethrough and through the bottom wall 29, as illustrated more particularly in Fig. 7. The finger 32 is disposed in one of the recesses 28, as shown, especially in Fig. 2.

Located on the boss 31 of the rear wall 29 is a center plug contact, comprising divergently disposed spring arms 35 and 36 formed by a substantially V-shaped strip, and located over the arm 35 is one end 37 of a fourth coupling finger 38 that is bowed, as shown, and is disposed in the other recess 28 of the body section. This finger 38 has an opening 39, through which the center plug contact 35—36 passes, and the parts are secured to the rear wall 29 of the plug receiving socket by a central fastening screw 40 passing through the portion 37, the arm 35 and the bottom wall 29.

The relation of the parts when in assembled position will be clear by reference to Fig. 2. As already explained, the protective casing 10—11 incloses the receptacle, comprising the separable sections 16 and 17. When said sections 16 and 17 are in associated relation, the spring coupling fingers 25 will interlock with the coupling fingers 32 and 38, so that the wire terminal plates 21 and their binding screws 23 will be electrically connected to the plug contact elements 29 and 36, and the two parts of the receptacle also securely, though separably held together.

To wire the device, all that is necessary is to unscrew the cylindrical body 10 from the cap 11, and draw the section 17 off from the section 16, as shown in Fig. 3, whereupon the binding screws 23 are readily accessible, and the wires passed through the cap 11 and the base 16 can be easily connected. When said connection has been accomplished all that is necessary is to return the body section 17 of the receptacle member to its position against the base 16, whereupon the yielding coupling fingers will snap into contacting and interlocking engagement.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

I claim:

1. In an electrical socket, the combination of a receptacle comprising two sections separably connected together by a spring snap-fastening, and an outside protective casing inclosing the receptacle and arranged to hold the sections thereof against disengagement, said casing comprising two sections having a screw connection which constitutes the lock for the snap-fastening of the receptacle sections.

2. In an electrical socket, the combination with an outer protective casing comprising a cylindrical body and a detachable cap connected to the rear end thereof, of a receptacle arranged within the casing and comprising separable base and body sections, the former being secured to the cap and the latter being loosely arranged within the cylindrical body of the casing, said body section of the receptacle having a plug receiving socket, plug contact elements located in the socket and having rearwardly extending coupling fingers, and wire terminals secured to the base and having forwardly extending coupling fingers that yieldingly and detachably interlock with the fingers of the plug contacts.

3. In the electrical socket, a receptacle element having a plug-receiving socket, a screw shell contact located in the socket, a clamping plate engaging the screw shell contact and having a rearwardly extending coupling finger, a fastening device securing the shell contact and clamping plate to the receptacle element, and a base part having an element separably connecting with said coupling finger.

4. In an electrical socket, a receptacle element having a plug-receiving socket provided with a rear wall, a rearwardly extending coupling finger located against the rear wall, a center plug contact having a portion clamped between the rear wall and the coupling finger and a portion extending over and spaced from said coupling finger, and a base part having an element separably connecting with said coupling finger.

5. In an electrical socket, a receptacle element having a plug-receiving socket provided with a rear wall, a rearwardly extending coupling finger having a portion disposed in front of the rear wall, and also provided with an opening, a center plug contact spring doubled upon itself, one portion of the spring being interposed between the finger and the rear wall, said spring extending through the opening of the finger and having a portion located thereover and spaced therefrom, and a fastening device passing through the finger, the center plug contact, and engaging the rear wall of the plug-receiving socket.

In testimony whereof I hereunto affix my signature in the presence of two witnesses.

EDGAR H. FREEMAN.

Witnesses:
JOHN B. RUPPRECHT,
EDNA C. SMITH.